Patented Dec. 17, 1940

2,225,159

UNITED STATES PATENT OFFICE 2,225,159

ACID RESISTING GLASS FLUX

Alden J. Deyrup, Elizabeth, N. J., assignor to E. I. du Pont de Nemours & Company, Wilmington, Del., a corporation of Delaware No Drawing. Application March 17, 1937, Serial No. 131,528

7 Claims. (Cl. 106—36.2)

This invention relates to the decoration of ceramic surfaces such as surfaces of glass, china, tile, terra cotta, or similar ceramic materials. More particularly, this invention is concerned with a resistant pigmented glaze useful for decorating vitrified surfaces such as surfaces of glass, china, or other ceramic products.

Pigmented glazes suitable for decorating glassware have, of course, been in use for many years. It is common to utilize as a glaze material for decorating ceramic surfaces a low melting glass such as a lead borosilicate. Lead borosilicate glazes are usually made by melting together an oxide of lead, boric acid and silica in such proportions as to yield a glass with a suitable low melting point. After melting, the glass, while molten, is poured into water or fritted. The pigment is then added to the fritted borosilicate glaze and the mixture of glaze and pigment ground to a suitable fineness.

In use, the pigmented glaze suspended in a suitable vehicle may be applied to the glass or ceramic surface to be decorated by brushing, spraying, printing, or any other suitable operation. Glaze compositions intended for the decoration of glass surfaces must have a melting point sufficiently low so that when the glaze is applied to the glass surface, and the article, so decorated, again subjected to a heating operation, the pigmented glaze will melt before the glass object decorated reaches a temperature which is sufficiently high to cause softening or deformation of that glass object. The lead borosilicate glazes now known and used for the decorating of glass and other ceramic surfaces possess a suitably low melting point. But unfortunately such glazes have, in general, practically no resistance to chemical action. Not only are they somewhat soluble in water but, much more seriously, they are attacked very rapidly by dilute acids and alkalies. Glass articles decorated with such a glaze will rapidly lose their colored decorative coating, in whole or in part, if subjected to the action of acids or alkalies.

Having in mind the low resistance of lead borosilicate glazes to chemical action, it is one of the objects of this invention to develop a suitable glaze which will possess satisfactory resistance. Another object of the invention is the production of a glaze of relatively low water solubility and of increased resistance to dilute acids and alkalies. One of the major objects of this invention is, therefore, to prepare a resistant low melting glaze composition which may be pigmented, and which, when applied to a glass surface and fired at a temperature of about 1000 to 1100° F. for a period ranging from 5 to 20 minutes, will melt to a glossy surface. However, the resulting glossy surface must be of a very low water solubility and have a resistance to dilute acids and alkalies which is greatly superior to that experienced with the ordinary lead borosilicate glazes.

I have found that an acid- and alkali-resistant glaze of superior resistance properties can be prepared by melting together with titanium dioxide a batch consisting of the usual ingredients ordinarily employed for preparing lead borosilicate glazes (except the alkali metal oxides which are sometimes present in such glazes). The melting must be carried out at such a temperature that the titanium dioxide is completely dispersed and melted into the glaze, thereby forming a part of the homogeneous low-fusing glaze composition obtained as a result of the melting operation.

While titanium dioxide has previously been utilized as an ingredient in fusible glazes intended for application to sheet steel and to the sheet metals, it is indeed surprising that it can be utilized in the low melting glaze compositions of the type intended for application to glassware and other ceramic surfaces. In the glazes intended for application to sheet steel in which titanium dioxide has been employed, the fusing point of the glaze normally is not less than about 1450° F. Moreover, all sheet steel and sheet metal enamels, including those containing titanium dioxide, contain substantial amounts of alkali metal oxides, and, in addition, alumina and/or fluorides. The novel glassware decorating composition with which this invention is concerned contains no alkali metal oxides or alumina. Both in chemical composition and in melting point, glazes for decorating glassware are to be distinguished from those used for decorating metal.

The possibility of utilizing titanium dioxide in a glaze composition having a melting point sufficiently low to permit application of that glaze to glass surfaces, i. e. melting at a temperature of 1100° F. or below, had ordinarily been rejected by specialists in the ceramic decoration field because titanium dioxide is commonly classified as a refractory oxide. The utility of this relatively high melting oxide as an ingredient to impart resistant properties to very low fusing glazes such as those containing no alkali metal oxides was indeed surprising, since it had never before been utilized in glaze compositions other than in the high melting glazes applied to metallic surfaces.

By eliminating alkali metal oxides from my improved glazes the resistance of these glazes to both acids and alkalies has been substantially increased without elevating their melting point.

As examples of batch compositions for low melting lead borosilicate glazes of superior resistance to acids and alkalies, containing titanium dioxide melted in as an ingredient of the flux but containing no alkali metal oxides, the following typical batches may be given:

*Batch A*

|  | Per cent |
|---|---|
| Red lead | 71.0 |
| Boric acid | 4.5 |
| Flint | 23.0 |
| Titanium dioxide | 1.5 |
|  | 100.0 |

*Batch B*

|  | Per cent |
|---|---|
| Red lead | 61.0 |
| Boric acid | 14.0 |
| Flint | 14.0 |
| Titanium dioxide | 6.0 |
| Cadmium carbonate | 5.0 |
|  | 100.0 |

*Batch C*

|  | Per cent |
|---|---|
| Red lead | 46.0 |
| Boric acid | 10.0 |
| Flint | 31.0 |
| Titanium dioxide | 2.5 |
| Cadmium carbonate | 4.5 |
| Sodium fluoride | 6.0 |
|  | 100.0 |

After melting, the fluxes resulting from the foregoing batch compositions will have the following calculated compositions:

*A*

|  | Per cent |
|---|---|
| PbO | 72.0 |
| $B_2O_3$ | 2.5 |
| $SiO_2$ | 24.0 |
| $TiO_2$ | 1.5 |
|  | 100.0 |

*B*

|  | Per cent |
|---|---|
| PbO | 65.0 |
| $B_2O_3$ | 9.0 |
| $SiO_2$ | 16.0 |
| $TiO_2$ | 7.0 |
| CdO | 3.0 |
|  | 100.0 |

*C*

|  | Per cent |
|---|---|
| PbO | 48.0 |
| $B_2O_3$ | 7.0 |
| $SiO_2$ | 33.0 |
| $TiO_2$ | 3.0 |
| CdO | 3.0 |
| NaF | 6.0 |
|  | 100.0 |

The ranges in which the calculated contents of the novel fluxes will fall is apparent from the following general formula:

|  | Per cent |
|---|---|
| PbO | 40–75 |
| $B_2O_3$ | 1–10 |
| $SiO_2$ | 12–35 |
| $TiO_2$ | 1–8 |
| RF | 0–8 |

In this formula RF is an alkali metal fluoride such as sodium, potassium or lithium fluorides, or ammonium fluoride. It may also represent a mixture of any of the fluorides specified.

When no alkali metal fluorides or ammonium fluoride is present, the composition may be represented by the following general formula giving the average of each of the calculated ingredients:

|  | Per cent |
|---|---|
| PbO | 50–75 |
| $SiO_2$ | 12–25 |
| $TiO_2$ | 1–8 |
| $B_2O_3$ | 1–10 |

All these percentages are by weight, based upon the total weight of the melted flux. It will be noted that alkali metal oxides are not present in any compositions as I have found them to be detrimental in decreasing the resistance of the glazes to alkalies and acids and in increasing the melting point or causing devitrification. The function of the alkali metal fluoride or fluorides and/or ammonium fluoride in my improved glazes of low melting point is to impart simultaneously resistance to both acids and sulfides. The fluorides may be omitted, however, if desired as my improved low-melting glazes possess superior resistance even without the fluorides being present therein.

When preparing my novel fluxes, which are of low water solubility, of superior resistance to acids and alkalies, and of relatively low melting points, sufficiently low to permit satisfactory application of the pigmented glazes to glass objects to be decorated, the materials comprising the batch are mixed together and placed in a refractory crucible. Heat is applied and the crucible heated to a temperature of about 1100° C. (approximately 2000° F.). After frothing has ceased and while the flux is still molten, it is poured into water and thereby fritted. The coarse fritted glasses thus obtained may then be ground together with any of the known ceramic pigments in the usual proportions and in the usual manner. Pigmented glazes suitable for use on vitrified ceramic surfaces such as surfaces of glass, porcelain, etc. are thereby produced, which are not suited, of course, for decorating metals. These glazes may be handled and utilized similarly to the well known lead borosilicate glasses which are normally employed for imparting colored decorative coatings to glass and porcelain objects. In mode of handling, application and in the temperature and method of melting, these lead borosilicate glaze compositions are similar to ordinary lead borosilicate compositions and the new products differ therefrom only in their greatly superior resistance to attack under the action of corrosive reagents.

In order to demonstrate the superior resistance of my novel low melting glazes, various articles were coated with glazes prepared from the batch compositions previously designated by the letters A, B and C. These pigmented glazes, after application to the objects to be decorated, were then subjected to tests to determine their resistance to chemical action, these tests being those specified in the subsequent examples.

Example 1

A green glaze composition was prepared utilizing Batch A as given above, including therewith a small amount of a green pigment. Pieces of glass were coated with this green glaze and immersed in ordinary vinegar at room temperature for a period of about one hour. As a comparison, a glass object coated with a similar green glaze, formulated using the ordinary lead borosilicate now known to the art, was similarly subjected to the action of vinegar for the same period of time. At the end of one hour the glaze that had been prepared with the ordinary lead borosilicate composition was almost entirely destroyed. The improved glaze containing titanium dioxide was but slightly affected and its decorative qualities were not impaired in any way by the treatment.

Example 2

Pieces of glass coated with the respective glazes described in Example 1 were moistened and then exposed to fumes of hydrogen sulfide gas. The glazes made with the usual lead borosilicate fluxes become notably darkened upon exposure whereas the novel improved glazes containing titanium dioxide showed no darkening whatever.

Example 3

Glazes similar to those compared in Example 1 were applied to glass objects and those glass objects subjected to the action of warm alkaline caustic alkali solutions for periods of several hours. At the end of that period the lead borosilicate glaze compositions now known to the art were substantially removed from the glass articles, while my novel glazes containing titanium dioxide were substantially unattacked.

The relative proportions of lead oxide, boric oxide and silica may be varied with respect to each other from the calculated compositions previously given, in accordance with methods now commonly known and described in the art of preparing low fusible lead borosilicate glazes. The cadmium carbonate ingredient where present in my batch compositions serves to stabilize cadmium sulfoselenide red pigment employed when it is desired to impart red or orange colors to the glaze. The amount of titanium dioxide previously specified in the typical batch compositions given may be varied somewhat, but I have found that best results are obtained when the titanium dioxide content of the batch ranges from 1 to 8% of the melted composition. Amounts in excess of 8% are generally objectionable because they tend to prevent the development of a glossy surface on firing. Alkali metal oxides in any appreciable or substantial amount are, of course, absent as I have found them to be detrimental as previously pointed out.

In selecting raw materials to be utilized in making up my improved glaze compositions a wide variety of chemical compounds may be selected to secure the elements indicated in the calculated flux compositions. The necessary lead oxide may be obtained from either white lead, litharge, red lead, lead nitrate or similar lead compounds. If desired, two or more lead compounds in any desired proportion may be utilized to supply the lead oxide content. The silica may be secured from sand, flint, or other convenient source or combination of sources.

In melting together the components of my improved glaze definite conditions as to temperature and time need not be maintained. It is only necessary to bring the batch mixture to its melting point and hold it for a sufficient period of time so that the components react and form a molten glass which is reasonably free from bubbles. As now appreciated, bubbles may frequently be due to the decomposition of constituents in the molten glass and the molten material should be heated for a time sufficiently long to eliminate any bubbles which may be formed.

While molten glass is usually poured into water in the fritting operation the melt can also be poured out upon any convenient clean surface. After pouring, it may then be crushed and ground or otherwise disintegrated in accordance with any suitable procedure.

I have found that any well known ceramic pigment may be introduced into my improved glazes by milling or grinding. Examples of suitable white pigments are titanium dioxide, and lead molybdate. Other pigments which can be milled in with the frit or melted-in with the raw material batch are cadmium sulfide, iron oxide, cobalt aluminate, cobalt oxide and lead chromate. The exact proportion of pigment to be incorporated in the glaze depends chiefly upon the color which is desired and the nature of the pigment. Generally it lies within the range 1 to 20% of pigment, based upon the total weight of the flux. Ordinarily it may be either melted in the glaze composition or added thereto as a mill addition after fritting as now known in the art.

In the appended claims the term lead borosilicate, or glazes of the lead borosilicate type, is intended to define my improved glazes consisting essentially of lead oxide, boric oxide and silicate, with which titanium dioxide is melted in, which glazes do not contain alkali metal oxides. The term alkali metal fluoride or fluorides, wherever appearing, is intended to include ammonium fluoride as well as fluorides such as those of the metals sodium, potassium and lithium.

To those skilled in the art, many modifications and widely different embodiments and applications of my invention will be readily suggested. The disclosures and descriptions given herein are intended to be illustrative and not restrictive. Since various changes may be made in the compositions, proportions, procedures and details disclosed herein without departing from the spirit of my invention and the scope thereof, it is intended that the appended claims shall be the measure of that scope.

I claim:

1. A low melting lead borosilicate glaze composition suitable for application to glass or other ceramic ware to be decorated and having a fusing point below about 1100° F. which has the following composition: lead oxide, 50 to 75%; silica, 12 to 25%; boric oxide, 1 to 10%; titanium dioxide, 1 to 8%, said titanium dioxide being incorporated by fusing with the other ingredients of said glaze, said proportions being by weight based on the weight of the melted flux.

2. A low melting lead borosilicate glaze composition as defined in claim 1 which includes a suitable amount of a ceramic pigment.

3. A low melting lead borosilicate glaze composition suitable for application to glassware to be decorated and having a fusing point below about 1110° F. which has the following composition: lead oxide 40 to 75%; silica 12 to 35%; boric oxide 1 to 10%; titanium dioxide 1 to 8% said titanium dioxide being incorporated by fusing with the other ingredients of said glaze and an alkali metal fluoride in amounts up to 8%; said proportions being by weight based on the weight of the melted flux.

4. A composition as defined in claim 3 wherein the fluoride content is supplied by employing a mixture of two or more alkali metal fluorides.

5. A low melting lead borosilicate glaze composition as defined in claim 3 which includes 1 to 15% of a suitable ceramic pigment.

6. A glass object decorated with the glaze of claim 1.

7. A glass object decorated with the glaze of claim 3.

ALDEN J. DEYRUP.

CERTIFICATE OF CORRECTION.

Patent No. 2,225,159. December 17, 1940.

ALDEN J. DEYRUP.

It is hereby certified that error appears in the printed specification of the above numbered patent requiring correction as follows: Page 3, second column, line 73, claim 3, for "1110° F." read --1100° F.--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.